United States Patent [19]

Beharry et al.

[11] Patent Number: 5,607,715

[45] Date of Patent: Mar. 4, 1997

[54] FLAVORED COOKING OIL HAVING REDUCED ROOM AROMA

[75] Inventors: Christopher R. Beharry, Cincinnati; David A. Volker, North Bend, both of Ohio

[73] Assignee: The Procter & Gamble Company, Cincinnati, Ohio

[21] Appl. No.: 406,608

[22] Filed: Mar. 20, 1995

[51] Int. Cl.$^6$ ............................. A23D 7/005; A23D 7/00
[52] U.S. Cl. ............................. 426/604; 426/651
[58] Field of Search ....................... 426/604, 651

[56] References Cited

U.S. PATENT DOCUMENTS

| | | | |
|---|---|---|---|
| 3,415,658 | 12/1968 | Cunningham et al. | 99/163 |
| 3,415,659 | 12/1968 | Purves | 99/163 |
| 3,415,660 | 12/1968 | Purves et al. | 99/163 |
| 3,663,236 | 5/1972 | Holloway | 99/134 |
| 3,860,734 | 1/1975 | Huth et al. | 426/369 |
| 4,130,562 | 12/1978 | Dubs et al. | 260/302 |
| 4,285,981 | 8/1981 | Todd et al. | 426/250 |
| 4,315,947 | 2/1982 | Todd et al. | 426/250 |
| 4,384,008 | 5/1983 | Millisor | 426/613 |
| 4,472,447 | 9/1984 | Mizutani et al. | 426/537 |
| 4,741,914 | 5/1988 | Kimizuka et al. | 426/537 |
| 5,059,437 | 10/1991 | Todd | 426/250 |
| 5,087,458 | 2/1992 | Witkewitz et al. | 426/3 |
| 5,204,023 | 4/1993 | Behan et al. | 252/367 |
| 5,320,862 | 6/1994 | La Tona | 426/650 |

*Primary Examiner*—Carolyn Paden
*Attorney, Agent, or Firm*—Rose Ann Dabek

[57] ABSTRACT

Disclosed are flavored oils for use in deep frying, stir-frying and marinating, which when heated, exhibit reduced aroma. The flavored oils consist essentially of an edible oil, a flavoring agent and a polyethylene sorbitan monoester.

22 Claims, No Drawings

FLAVORED COOKING OIL HAVING REDUCED ROOM AROMA

FIELD OF INVENTION

This invention relates to flavored oil which when heated have substantially reduced levels of aroma.

BACKGROUND OF THE INVENTION

It is common practice to prepare meats and vegetables by frying, stir-frying or marinating the vegetable or meat with a flavored oil to impart a desirable flavor. Although the flavored oils are a convenient means to flavor foods, the flavor imparted by the oils is generally thought to be inferior to that of the fresh flavor. A convenient way to boost the flavor level imparted to food products is to increase the level of oleoresins, oil essences and spices added to the oil. Unfortunately, when high concentrations of flavorants are used, the aroma exhibited by the oils rapidly fills the surrounding air.

One of the problems when cooking with flavored oils is that the oils are often heated prior to or during cooking. Often the release of the aroma is accentuated by exposure to high temperatures. The characteristic aroma of some flavorants, in particular garlic and onion, are liked by some and disliked by others. Moreover, when released in high concentrations, the reaction by consumers who generally like the aroma vary considerably. The wide range of tolerances or preferences for the aroma generated by flavored oils makes it difficult to include in the oil a level of flavorant needed to impart the desirable level of flavor to the food which is being cooked while not overwhelming the area with the aroma.

Another problem with increasing the level of flavorant added to the oil while trying to reduce the aroma, is the problem of generating off-flavors. In some cases, the combination of high concentrations of flavorant and high levels of ingredients to suppress the aroma, produce an off flavor which generally has a lingering aftertaste.

Attempts have been made to reduce the level of aroma produced by the oil while imparting desirable flavor to the food product. Common methods for reducing the level of undesirable odors include deodorizing, heating, boiling, rotary steam stripping, dehydrating or chemically treating the flavorant prior to adding it to the oil. None of these approaches are satisfactory however, because they are time consuming, and often require many steps, special equipment or use undesirable chemicals. Moreover, while these methods work well for some oils, application of these methods to flavored oils would tend to reduce the flavors added to the oil, thus eliminating or greatly reducing the flavor benefit. Another method includes removing the aroma completely, see, for example, U.S. Pat. No. 4,741,914 to Kimizuka et al. issued May 3, 18, 1988 and U.S. Pat. No. 4,377,660 to Morinaga issued Mar. 22, 1983. However, the problem in removing the aroma totally is that taste perception is often influenced by aroma. Therefore a need exists for a flavored oil which incorporates levels of flavorant which deliver deskable flavor characteristics to food but which do not exhibit overpowering or undesirable levels of aroma when used for cooking.

Surprisingly, it has been found that the aroma exhibited by flavored oils containing increased levels of flavorant, can be reduced by incorporating specific levels of polyoxyethylene sorbitan monoesters, known food emulsifiers, into the flavored oil.

Accordingly, an object of this invention is to provide a flavored oil composition exhibiting reduced aroma when heated.

Another object of this invention is to produce a flavored oil which will deliver a desirable level of flavor to the end product.

Still another object of this invention is to provide an easily prepared flavored oil exhibiting reduced aroma when heated.

These and other objects of this invention will become apparent from the detailed description which follows.

SUMMARY OF THE INVENTION

The present invention is directed to flavored oils which when heated, release substantially reduced levels of aroma consisting essentially of:

a) from about 98.5% to about 99.94% of an edible fat;

b) from about 0.01% to about 1% of a flavoring component; and c) from about 0.05 to about 0.5% of a polyethylene sorbitan monoester

DETAILED DESCRIPTION

The present invention relates to flavored oils wherein the level of aroma released during cooking is reduced.

The terms "fat", "oil" or "edible oil" as used herein refer to edible fatty substances which are liquid at or above 120° F. (48.9° C.), including natural or synthesized fats and oils consisting essentially of triglycerides such as, for example, soybean oil, sunflower oil, fish oil, lard and tallow, which may have been partially or completely hydrogenated or modified. This term also encompasses fatty materials having properties similar to triglycerides, such as non-absorbable, non-digestible polyol fatty acid polyesters, reduced calorie fats and the like, generally referred to as fat substitutes, which may be partially or fully indigestible.

The term "flavoring component" or "flavorant" as used herein is intended to include spices, herbs, oleoresins derived from spices, essential oils obtained from the plants of spices and herbs. This term also apply to substances or mixture of substances which impart a characteristic taste to the oil, for example, garlic and onion.

The term "spice" or "spices" as used herein refer to natural or synthetically synthesized aromatic flavoring materials of vegetable origin which are the dried seeds, buds, fruit or flower parts, bark or roots of plants, usually of tropical origin.

The term "consisting essentially of" as used herein means that the necessary stated ingredients are present in the necessary stated amounts, but that the presence of other ingredients or additives which do not interfere with attainment of the objectives of the invention is not precluded. In this sense, it is to be noted that additional ingredients such as antioxidants, coloring agents, flavor enhancers, vitamins, suspension agents, water, etc., are not excluded, to the extent that they do not interfere with attainment of the objectives of the invention.

The term "reduced calorie" as used herein refers to fats that provide at least about 10%, and preferably at least about 30%, reduction in calories relative to corn oil. The reduction in calories provided by these reduced calorie fats can be determined by studies similar to that described by Peters, J. C. et al., *Journal of the American College of Toxicology*, Vol. 10, No. 3, 1991, pp. 357–367.

The term "polyol" as used herein refers to polyhydric alcohols containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentaerythritol and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

The term "polyol fatty acid polyester" as used herein refers to polyols having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially nondigestible and consequently nonabsorbable by the human body. It is not necessary that all of the hydroxyl groups of the polyol be esterified, but it is preferable that disaccharide molecules contain no more than 3 unesterified hydroxyl groups for the purpose of being nondigestible. Typically, substantially all, e.g., at least about 85%, of the hydroxyl groups of the polyol are esterified. In the case of sucrose polyesters, typically from about 7 to 8 of the hydroxyl groups of the polyol are esterified.

The fatty acid radicals typically contain at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans-isomers, and can be the same for all ester groups, or can be mixtures of different fatty acids.

The term "epoxide extended polyols" as used herein refers to esterified epoxide extended polyols. The preferred materials are epoxylated glycerine having 2 to 8 epoxy groups. These epoxylated glycerines are acylated with fatty acids having from 8 to 24 carbon atoms. Preferably the glycerine contain an average of 5 ethoxyl groups.

All percentages are by weight unless otherwise stated.

COMPONENTS

EDIBLE FAT

The present invention is applicable to edible fats, reduced calorie fats, non-digestible, and non-absorbable fats which are liquid at or above 120° F. (48.9° C.). Suitable fats may be selected from animal, vegetable and marine sources and mixtures thereof. A wide variety of natural liquid oils can be used as the flavored oil of this invention. Included among suitable natural oils are olive oil, sunflower oil, safflower oil, sesame seed oil, corn oil, canola oil, rapeseed oil, peanut oil and soybean oil. Also suitable for use, are virgin oils, genetically bred oils, bioengineered or microbially sourced oils or oils processed to remove undesirable characteristics. The oils may be used alone or as blends. Particularly preferred oils for use in the present invention are canola oil, corn oil, sunflower oil and soybean oil.

One reduced calorie fat that has been found to be useful as a cocoa butter substitute comprises a fairly high level (e.g., at least about 85%) of combined MML and MLM triglycerides, where M is typically a mixture of $C_8$–$C_{10}$ saturated fatty acids and L is predominantly behenic acid, but can be $C_{20}$–$C_{24}$. See U.S. Pat. No. 4,888,196 to Ehrman et al., issued Dec. 9, 1989 and U.S. Pat. No. 5,288,512 issued to Seiden, Feb. 22, 1994 for the synthesis and more detailed description of these reduced calorie fats. Other reduced calorie triglycerides include those that are mixtures of short chain ($C_2$–$C_8$) fatty acid and long chain ($C_{18}$–$C_{24}$) triglycerides. Suitable non-digestible edible fats for use herein include liquid polyol fatty acid polyesters (see Jandacek; U.S. Pat. No. 4,005,195; Issued Jan. 25, 1977); liquid esters of tricarballylic acids (see Hamm; U.S. Pat. No. 4,508,746; Issued Apr. 2, 1985); liquid diesters of dicarboxylic acids such as derivatives of malonic and succinic acid (see Fulcher; U.S. Pat. No. 4,582,927; Issued Apr. 15, 1986); liquid triglycerides of alpha-branched chain carboxylic acids (see Whyte; U.S. Pat. No. 3,579,548; Issued May 18, 1971); liquid ethers and ether esters containing the neopentyl moiety (see Minich; U.S. Pat. No. 2,962,419; Issued Nov. 29, 1960); liquid fatty polyethers of polyglycerol (See Hunter et al; U.S. Pat. No. 3,932,532; Issued Jan. 13, 1976); liquid alkyl glycoside fatty acid polyesters (see Meyer et al; U.S. Pat. No. 4,840,815; Issued Jun. 20, 1989); liquid polyesters of two ether linked hydroxypolycarboxylic acids (e.g., citric or isocitric acid) (see Huhn et al; U.S. Pat. No. 4,888,195; Issued Dec. 19, 1988); liquid esters of epoxide-extended polyols (see White et al; U.S. Pat. No. 4,861,613; Issued Aug. 29, 1989); all of which are incorporated herein by reference, as well as liquid polydimethyl siloxanes (e.g., Fluid Silicones available from Dow Corning). Preferably, a liquid oil is used in the present invention.

Unless otherwise stated, the amount of oil or fat in the composition is based on that present in the final oil composition. The total amount of oil includes the amount of oil that may be used to dilute the flavoring component. For example, if a 2% oil dispersion of a flavoring component is used, the amount of oil in which the flavoring component is dispersed in would be included in the total amount of oil present. The compositions of the present invention comprise from about 98.5% to about 99.94%.

FLAVOR COMPONENT

The flavoring component is an ingredient used to impart flavor. Natural or synthetic flavoring components may be used in the present invention. The preferred flavoring components are natural spices or synthetic flavors derived from or designed to imitate spice flavors. Citrus flavors such as lemon or orange are also preferred. The flavoring components contain volatile oils, which are released upon heating. It is preferred that the flavoring component is oil soluble. It is even more preferred that the flavoring component is in a liquid form to minimize processing steps. A powdered form of the flavoring component can be used but it is not preferred. If the flavoring component is in the form of a powder, it is preferred that the flavoring component be dispersed or dissolved in oil prior to mixing with the edible oil. Typical flavoring components include thyme, rosemary, dill, oregano, clove, ginger, coriander, nutmeg, sage, garlic, onion, basil, chile pepper, paprika, lemon, butter and mixtures thereof. The preferred flavoring components are garlic, onion, basil and chile pepper.

The flavoring component is added in an amount capable of imparting a desired flavor to the oil and food product being cooked. The amount may be adjusted if mild or strong flavored oil is desired. The amount of flavoring component added may be as low as 0.01% or as high as 1.0% based on the finished product weight. The level is dependent upon many variables, for example, intensity of flavored desired, type of flavoring component used, type of oil being flavored, etc. The flavoring component may be in a concentrated form or diluted with other suitable carriers such as vegetable oil. Diluted flavors are easier to handle and to meter into the edible fat. Preferably a level of from about 0.1% to about 0.5% of the flavor component is used to impart a desired flavor, more preferably, from about 0.15 to about 0.25% of the flavor component is used. The amount of flavoring component effective to flavor the oil can easily be determined by one skilled in the art.

AROMA SUPPRESSOR

The essential ingredient which acts to reduce the aroma during cooking is a polyoxyethylene sorbitan monoester as distinguished from di-, tri-, or higher partial or complete esters of sorbitan. It is essential that the fatty acid portion of the polyoxyethylene sorbitan monoester contain from about 14 to about 18 carbon atoms. Examples of suitable fatty acids for this purpose are myristoleic, palmitoleic, myristic acid, palmitic acid, stearic acid, oleic, linoleic and linolenic acids and mixtures thereof. The preferred polyoxethylene sorbitan ester is a commercially available product sold under the name "Glycosperse 0–20" or "Tween-80"—which is a mixture of polyoxyethylene sorbitan esters of predominantly monounsaturated oleic acid; it contains an average of about twenty (20) units in the molecule [i.e. polyoxyethylene (20) oxyethylene sorbitan monooeate, herein after referred to as "polysorbate 80"]. These materials are commercially available from Lonza Company (NJ) and ICI (Wilmington, Del.).

It is important that the polysorbate 80 is incorporated into the edible oil and not the flavoring. Some flavoring agents are formulated to include emulsifiers. It has been found that when high levels of polysorbate 80 are incorporated into the flavoring component phase separation occurs in the flavoring component, making usage difficult. It has also been found that high levels of polysorbate 80 may also cause separation of the flavoring components from the oils. Polypropoxylated sorbitan monoesters can also be used, but they are not preferred.

The flavored oils of the present invention comprise from about 0.05% to about 0.5%, preferably from about 0.08% to about 0.3% and more preferably about 0.10% to about 0.15% of the polyoxyethylene sorbitan esters. At levels above about 0.5% by weight, the ability of the polyoxyethylene sorbitan ester to reduce the aroma is about equal to that at the 0.5% level. Further, the ability to impart desired flavor to the end product becomes increasingly difficult.

The process described below by way of example permits the production of flavored oils which release reduced aroma when heated. Any conventional mixing technique can be used. There is no special apparatus or processing equipment needed. The processing normally comprises the steps of:

(1) Mixing oil with the flavoring component;

(2) Combining the mixture of step 1 with polysorbate 80 until thoroughly blended.

Preferably, polysorbate 80 is incorporated into the edible oil containing the flavoring component at a temperature of from about 40° F. (4.4° C.) to about 180° F. (82.2° C.), and in quantities of from about 0.05% to about 0.5% based on the oil weight. However, any suitable method can be used to add the flavor to the edible oil ingredient. It is important that sufficient mixing occurs so that the flavor and polyoxyethylene sorbitan esters are uniformly incorporated in the oil.

The following example illustrates the invention but is not meant to be limiting thereof. All percentages are by weight unless otherwise indicated.

EXAMPLE 1

A flavored oil (A) consisting of 794 grams of a canola/corn oil blend, 1 g of *polysorbate 80 and 5.0 grams of garlic flavor is prepared in the following manner. Liquid oil, polysorbate 80 and flavorant is homogeneously mixed at a temp of about 70° F. (21° C.). Separately, a control (B) is prepared by mixing 795 grams of a canola/corn oil blend and 5 grams of garlic flavor.

In separately sealed and controlled rooms, flavored oil with polysorbate 80 (A) and flavored oil, control oil (B) is aroma tested by panelists who are specially trained for this kind of test. A 10 gram sample of each oil product was poured into a #3140 pyrex glass bowl (125×65). Each flavor sample is diluted with 90 grams of bland vegetable oil. Each bowl is placed on an electric hot plate and heated to a temperature of 350° F. (177° C.). Once the product reaches 350° F. (177° C.), the aromas are evaluated by the panelists. The results are shown in Table 1. In this test lower numbers represent lower aroma levels.

TABLE 1

|  | Flavored oil (A) | Flavored oil (B) | Difference |
|---|---|---|---|
| Overall Intensity | 22.8 | 32.7 | 9.9 |
| Raw Garlic | 20.2 | 25.2 | 5.0 |
| Roast Garlic | 12.3 | 21.5 | 9.2 |
| Off-Notes | 2.7 | 3.7 | 1.0 |

Table 1 shows that the product containing polysorbate 80 (A) is significantly lower in overall aroma.

*Polysorbate 80 is a nonionic, surface-active emulsifying agent produced by condensing ethylene oxide with sorbitan monooleate in the mole ratio of from about 20:1 and is available from Lonza, Fairlawn, N.J.

What is claimed is:

1. A flavored oil having reduced aroma when heated consisting essentially of:

a) from about 98.5% to about 99.94% of an edible fat;

b) from about 0.01% to about 1% of a flavorant having an aroma; and c) from about 0.05 to about 0.5% of a polyoxyethylene sorbitan monoester, wherein the aroma of the flavored oil is reduced when heated.

2. The flavored oil of claim 1 wherein said fat is selected from the group consisting of canola oil, corn oil, soybean oil, sunflower oil and mixtures thereof.

3. The flavored oil of claim 2 wherein said flavors are selected from the group consisting of garlic flavor, basil flavor, thyme flavor, oregano flavor, chile pepper flavor, paprika flavor, onion flavor and mixtures thereof.

4. The flavored oil of claim 2 wherein said flavors are selected from the group consisting of garlic or onion and mixtures thereof.

5. The flavored oil of claim 4 wherein the level of polyoxyethylene sorbitan monoester is from about 0.08% to about 0.3%.

6. The flavored oil of claim 5 wherein the level of polyoxyethylene sorbitan monoester is from about 0.10% to about 0.15%.

7. The flavored oil of claim 6 wherein the polyoxyethylene sorbitan monoester is polysorbate 80.

8. The flavored oil of claim 7 wherein said fat is selected from the group consisting of canola oil or corn oil and mixtures thereof.

9. The flavored oil of claim 6 wherein the level of flavoring component is from about 0.1% to about 0.5%.

10. The flavored oil of claim 2 wherein the level of flavoring component is from about 0.15% to about 0.25%.

11. The flavored oil of claim 1 wherein said edible fat is selected from the group consisting of reduced calorie fats or polyol fatty acid polyesters and mixtures thereof.

12. The flavored oil of claim 11 wherein said flavors are selected from the group consisting of garlic flavor, basil flavor, thyme flavor, oregano flavor, chile pepper flavor, paprika flavor, onion flavor and mixtures thereof.

13. The flavored oil of claim 12 wherein the level of polyoxyethylene sorbitan monoester is from about 0.08% to about 0.3%.

14. The flavored oil of claim 13 wherein the level of polyoxyethylene sorbitan monoester is from about 0.1% to about 0.15%.

15. The flavored oil of claim 14 wherein the polyoxyethylene sorbitan monoester is polysorbate 80.

16. The flavored oil of claim 13 wherein the level of flavoring component is from about 0.15% to about 0.25%.

17. The flavored oil of claim 12 wherein the level of flavoring component is from about 0.1% to about 0.5%.

18. The flavored oil of claim 12 wherein the polyol polyester is a sucrose polyester.

19. The flavored oil of claim 18 wherein the polyethylene sorbitan monoester is polysorbate 80.

20. The flavored oil of claim 1 wherein said edible fat is an epoxide extended polyol.

21. The flavored oil of claim 1 wherein said edible fat is reduced calorie fat that is a mixed triglyceride of short and long chain fatty acids.

22. The flavored oil of claim 21 wherein said flavors are selected from the group consisting of garlic flavor, basil flavor, thyme flavor, oregano flavor, chile pepper flavor, paprika flavor, onion flavor and mixtures thereof.

* * * * *